Aug. 16, 1932.  P. D. TEMPLE  1,872,528
EXTENSION CORD ELECTRIC IRON HOLDER
Filed March 2, 1929   2 Sheets-Sheet 1

Witness
R. B. Davison

Inventor,
Paul D. Temple,
By Wilkinson, Huxley, Byron & Knight
Attys.

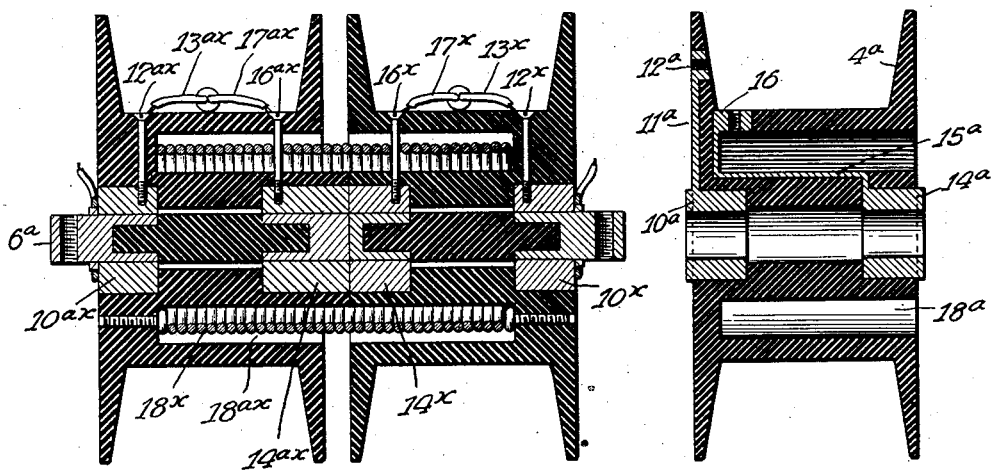
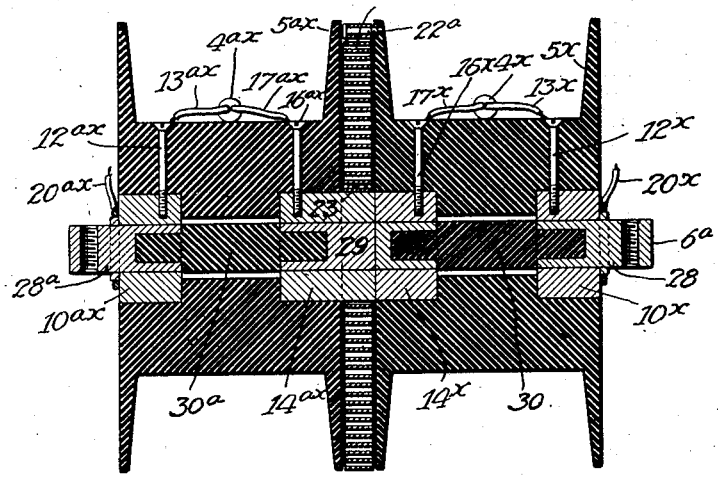

Patented Aug. 16, 1932

1,872,528

UNITED STATES PATENT OFFICE

PAUL D. TEMPLE, OF CHICAGO, ILLINOIS

EXTENSION CORD ELECTRIC IRON HOLDER

Application filed March 2, 1929. Serial No. 344,050.

This invention relates to a holder for electrically heated smoothing irons.

One object of the invention is to provide a holder that not only serves as a safe receptacle for the hot iron while the iron is at rest, but has provided upon it means for automatically coiling and paying out the cord which serves as an electrical conductor for feeding current to the resistance element of the iron; the device as a whole being of sufficient mass to have inherent stability and remain immovable under the tension maintained on the cord by the winding mechanism as the cord moves outward and inward under the motions incident to the use of the iron.

Another object of the invention is to construct the means for paying out and winding in the cord in two related winding units, independently movable, so that the cord may be divided into two lengths, one of which lengths may be wound on one winding unit and employed for establishing connection between the outlet receptacle of the normal house circuit in a manner to permit locating the iron holder at various distances from the outlet receptacle, while the other length of cord, may be wound upon the other winding unit, and serve as the electric connection for the iron, as already described; means being provided through which to establish electrical connections between the wires of one cord length and the corresponding wires of the other cord length, and one of these connections being preferably made to include a switch conveniently located for opening and closing the heating circuit as desired.

In the accompanying drawings in which the preferred embodiment of the invention as well as two modifications of the cord winding elements are shown—

Figure 3 is a detail view, also in axial section, showing one of the winding reels of Figure 2 separated from other parts.

Figure 4 is an axial sectional view showing a modified construction of the winding elements; and Figure 5 is a similar view showing a further modification.

Figure 1:
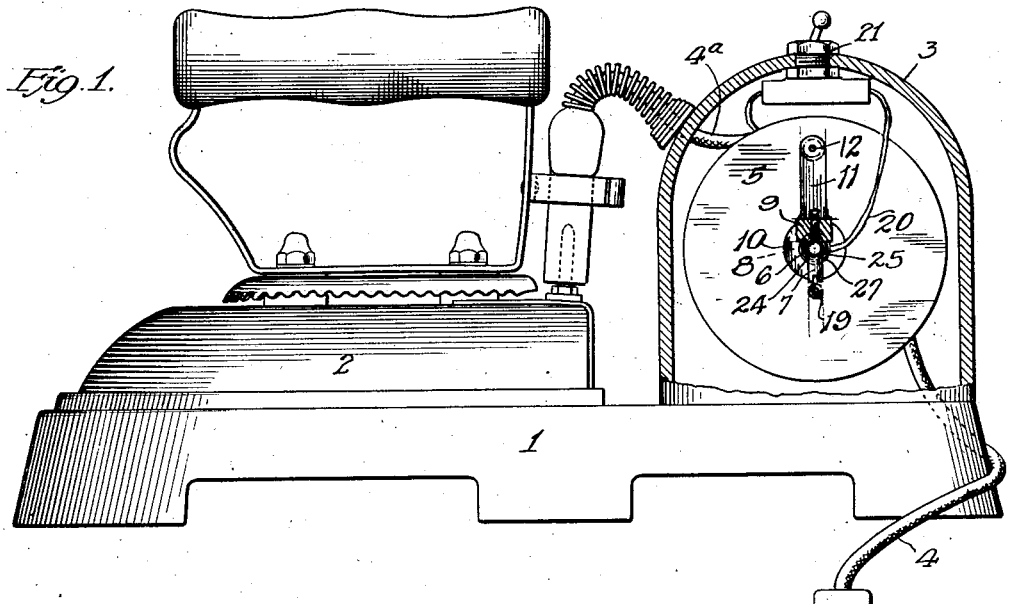
Figure 1 is a side elevation of the complete device with the end wall of the cord winding housing removed to disclose the parts within.
Figure 2:
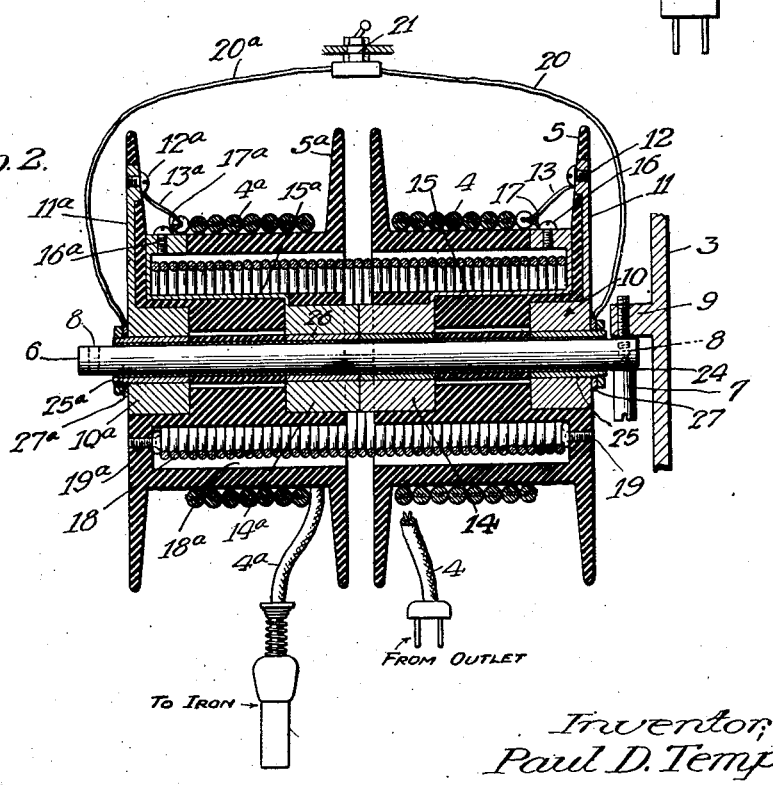
Figure 2 is an axial section of the two winding elements employed in Figure 1, together with the cords wound thereon, and the switch for opening and closing the circuit of said cords.

Referring to Figure 1, 1 represents an iron-receiving base of non-combustible material, for instance, cast iron, suitably designed to receive an iron 2, and 3 represents a housing mounted upon the base 1 and adapted to receive winding elements for two lengths 4 and 4a of double wire cord, of which the length 4 is suitably equipped for establishing electrical connection with an outlet receptacle of a house circuit, while the length 4a is equipped with conventional means for establishing connection with the iron 2. Within the housing 3 are mounted, coaxially, a pair of winding reels, of which one reel 5 is shown mounted upon an axle 6 in Figure 1, while the other reel 5a, mounted upon the same axle 6 and in axial abutment with the reel 5, is shown in Figure 2. Axle 6 is supported in any preferred manner in the housing 3, for instance, by means of screws 7 passing through diametric openings 8 in the ends of the axle and entering lugs 9 formed integrally with end walls of the housing 3.

Reel 5 is constructed with an outer conducting hub member 10 having a radial extension 11 to connecting screw 12 that receives one wire 13 of the cord 4, and an inner conducting member 14 with extension 15 leading to a binding screw 16 that receives the other wire 17 of the cord 4. Similarly, reel 5a is equipped with outer conducting hub member 10a, extension 11a, and binding screw 12a receiving wire 13a of the cord length 4a, and inner conducting hub member 14a having extension 15a and binding screw 16a that receives the other wire 17a of cord length 4a.

Reels 5 and 5a are free to rotate relatively upon the shaft 6 in either direction, and in order to resist such relative rotation yieldingly, the two reels are connected through means of a coil spring 18 located in the spring housing 18a formed in the respective reels, and anchored at its opposite ends to the respective reels, as shown at 19, 19a; and in order to electrically connect the two reels or the wires in the cord lengths wound upon them, the two inner hub members 14, 14a are in rubbing abutment, which by reason of their respective electrical connections with the screws 16 and 16a thereby serve to electrically connect the wire 17 of the cord length 4 with the wire 17a of the cord length 4a. Outer hub members 10 and 10a are electrically connected through means of wires 20 and 20a with a switch 21, which, as shown in Figure 1, occupies a position on the housing 3 within convenient reach for manipulation in opening and closing the circuit of the iron. Thus, when the free end of the cord length 4 is inserted in an outlet receptacle, and the free end of the cord length 4a is applied to the terminals of the iron, there is a complete circuit through the two wires of the cord length 4 to the respective binding screws 12 and 16, from said screws to the outer and inner conducting hub members 10 and 14, from hub member 10 through wires 20 and 20a to the hub member 10a, and from hub member 14 directly by frictional contact to the hub member 14a, thence from the hub members 14a and 10a to the binding screws 12a and 16a, and from the last-named binding screws through the respective wires of the cord length 4a to the iron; the circuit thus established being controllable through means of switch 21 interposed between wires 20 and 20a.

Cord lengths 4 and 4a are wound in opposite directions upon the reels 5 and 5a, and the spring 18 has an initial set under tension which causes it to rotate said reels in opposite directions sufficiently to take up the slack in both cords; and when either cord is pulled out it increases the tension of the spring so that whatever the position of the other cord, the length thus pulled out will be automatically rewound whenever it is slackened.

As shown in Figure 4, the spring pocket of Figures 2 and 3 may be omitted and a volute spring 22 fixed at its outer end 22a to the reel 5x, and at its other end 23 to the inner hub member 14a of the other reel 5ax; the reel 5x being provided with an inner hub member 14x which is in frictional electrical contact with the inner hub member 14ax as in Figure 2; and said reels 5x and 5ax being also provided with outer conducting hub members 10x and 10ax. The wires 13x and 17x of the cord length 4x are connected through screws 12x and 16x to the metallic hub members of the reel 5x, and similarly, wires 13ax and 17ax of the cord length 4ax are connected by screws 12ax and 16ax to the metallic hub members 10ax and 14ax, wires 20x and 20ax being employed for continuing the circuit through the hub members 10x and 10ax in any suitable manner, for instance, as shown in Figure 2.

According to Figure 5, the cylindrical spring chamber 18ax is employed for the helical spring 18x, and the screws 12x, 16x and 12ax, 16ax extend from the wires 13x, 17x and 13ax, 17ax into the inner and outer hub members 10x, 14x and 10ax, 14ax as described in Figure 4; the screws 16x and 16ax being passed between convolutions of the spring 18x in reaching the inner metallic hub members without defeating the functions of the parts concerned, since the spring is otherwise insulated from electrical connection and the screws 16x and 16ax are intended to be electrically connected.

In Figures 1 and 2, 24 represents an insulating sleeve surrounding the shaft 6 and upon the ends of which are mounted metallic bearing pieces 25, 25a upon which the outer metallic hub members 10, 10a are journaled. Similarly, upon the intermediate portion of the insulating sleeve 24 there is a metallic bearing piece 26 upon which both of the inner metallic hub members 14 and 14a are journaled, and which bearing piece 26 will establish electrical connection between the inner hub members 14 and 14a, thus rendering of secondary importance the frictional bearing between said members 14, 14a one against the other.

The electrical connection established by the wires 20 and 20a with the outer metallic hub members 10 and 10a, is through the medium of rings 27, 27a to which the wires are soldered and which are mounted upon the metallic journal pieces 25, 25a, so that the hub members 10, 10a are free to rotate relatively to these conductors without losing electrical connection therewith.

According to Figures 4 and 5, the shaft, which may be identified generally by the reference character 6a, is made up of metallic end members 28, 28a upon which the outer metallic hub members 10x, 10ax are in bearing, and an intermediate metallic shaft member 29 upon which the two inner metallic hub members 14x, 14ax are mounted and electrically united; and these metallic members of the shaft are physically united but electrically separated by means of the sections 30 and 30a of insulating material. Wires 20x and 20ax are united to the metallic journal members 28, 28a, and therefore electrically connected with the metallic hub members 10x, 10ax, in the same manner as described in connection with Figure 2, and therefore leave the reels free to rotate.

From the foregoing description it will be seen that the invention exemplifies an iron holder having incorporated in its construction means for automatically winding and paying out two cord lengths, one of which may be used to bridge the distance of the holder from the outlet socket of the ordinary house circuit when the iron holder is conveniently located for use as a receptacle for the hot iron, and the other of which may serve to complete the circuit with the iron and to be automatically paid out and wound in as the iron recedes from and approaches the holder during manipulation in service. And the holder not only serves to present in position convenient for use the cord winding and paying out means, but maintains a fixed position under the pull of the cord length that is connected with the iron, by reason of its inherent stability and weight.

The invention as described also exemplifies means whereby a pair of reels, mutually reacting one upon another through a common spring, may be mounted on a single axle with freedom of independent winding and unwinding movement, and with electrical connection established between them so that by suitably anchoring the ends of two cord lengths through binding screws provided on the respective reels, the said cord lengths will be united as parts of a single continuous circuit, one of the connections from cord to cord including a switch through which the circuit may be controlled.

I claim:

The combination with an electric smoothing iron, of a massive iron holder having a seat defining the position of the iron thereon; an upstanding electric cord receptacle on said holder in the rear of said seat; self winding take-up means for electric cords in said receptacle; and two cords electrically interconnected and wound upon said take-up means, one having means for connecting it with an electric outlet and the other being connected with the smoothing iron.

Signed at Chicago, Illinois, this 28th day of February, 1929.

PAUL D. TEMPLE.